No. 769,722.  
Patented September 13, 1904.

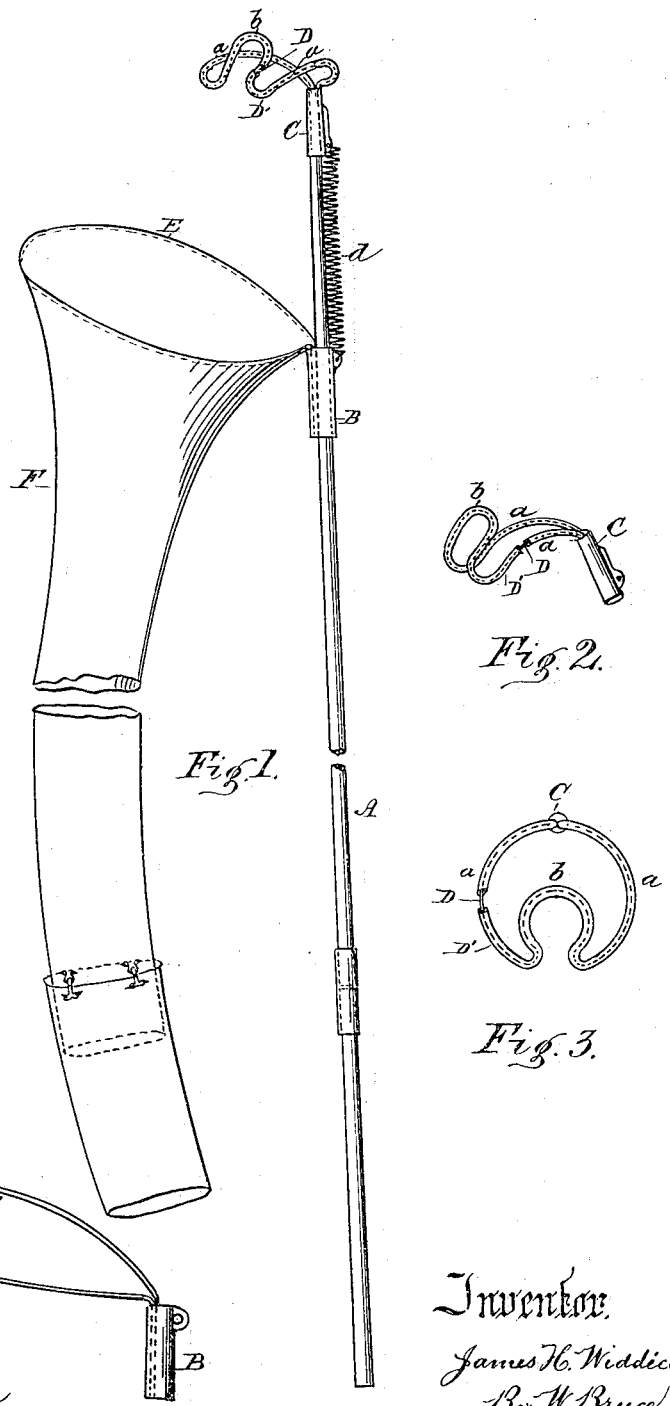

UNITED STATES PATENT OFFICE.

JAMES HENRY WIDDICOMBE, OF HAMILTON, CANADA, ASSIGNOR OF THREE-FOURTHS TO WILLIS H. COON, OF ROCHESTER, NEW YORK, AND GEORGE A. GRAHAM AND CHAS. E. HOLLAND, OF TORONTO, CANADA.

FRUIT-PICKER.

SPECIFICATION forming part of Letters Patent No. 769,722, dated September 13, 1904.

Application filed September 5, 1903. Serial No. 172,169. (No model.)

*To all whom it may concern:*

Be it known that I, JAMES HENRY WIDDICOMBE, a citizen of the Dominion of Canada, residing at the city of Hamilton, in the county of Wentworth and Province of Ontario, Canada, have invented certain new and useful Improvements in Fruit-Pickers; and I hereby declare that the following is a full, clear, and exact description of the same.

The invention relates to a very handy and convenient device for picking fruit—such as apples, pears, oranges, lemons, &c.—from their trees in a careful and expeditious manner without bruising the fruit.

The device comprises a circular-shaped arched hood having a central horseshoe-shaped form attached to the end of a rod, a ferrule made to slide on the rod a short distance below the hood, a spring connecting the ferrule with the top portion of the rod, a frame attached to the sliding ferrule to carry a chute to conduct the fruit to the picker's basket.

On the upper end of the rod or pole is attached a wire hood covered with rubber tubing and formed in a peculiar manner with the outer sides bent in an upward curve to inclose the fruit and a smaller central double inner horseshoe-shaped curve at a different angle to the larger one, the two ends of the hood being securely fastened to a ferrule, into which is inserted the top end of the rod to carry it.

About eight inches downward from the top of the rod is a ferrule made to slide on the rod or pole and held to the upper ferrule by a spiral spring, the top and bottom ends of which are secured to the upper and lower ferrule, and attached to the latter is a wire hoop or ring and a chute formed of any light fabric, as thin cotton or cheese-cloth, attached to the ring and made funnel-shaped at the mouth, the chute extending to any desired length to receive the fruit into any receptacle attached to the person of the picker or otherwise.

I attain these objects by the mechanism illustrated in the accompanying drawings, in which—

Figure 1 is a side view of the picker A embodying my invention. Fig. 2 is a side view of the top hood. Fig. 3 is a plan view of the same. Fig. 4 is a perspective view of the chute, frame, and ferrule.

In the drawings, A, Fig. 1, represents a rod, preferably of bamboo cane jointed to any desired length and having the qualities of lightness and strength combined, which is made to pass through the lower sliding ferrule B and into the upper ferrule C, to which it is attached.

D is the hood, formed of wire and covered with rubber tubing D' to protect the fruit while being picked. It has two upward side curves *a a* to comform to the rounded contour of the fruit and a central horseshoe-shaped curve *b*, formed at a different angle to the side curves *a a*. The ends of the wire of the said hood D are secured to the ferrule C, and its action in operation will be more fully explained hereinafter.

To the lower ferrule B is secured a wire hoop E, to which a funnel-mouthed chute F is attached in any convenient manner. This chute may be of any desired and preferably light woven fabric, such as thin cotton or cheese-cloth, and may be of any length desired to suit the length of the pole. As the pole A may be in jointed sections, so the chute may be made in sections and hooked together to increase the length according to the height of the trees from which the fruit is being picked. A spiral spring *d* is attached at each end, respectively, to the upper ferrule C and to the lower sliding ferrule B, which carries the chute, so as to save its frame E from being strained if it comes in contact with a branch while the fruit is being picked.

The practical operation of the device may be described as follows: The operator has a specially-formed bag (which is the subject-matter of a separate patent) in which the mouth of the bag-frame conforms to the contour of the trunk of the operator's body and is held by a strap over the shoulder, which when in place on his person he proceeds to join the pole to the required length to reach the fruit. He places the lower end of the chute F in his bag and raises the pole to the fruit in such a manner that the stem of the fruit enters the mouth of the central curve *a* of the hood D and the spherical form of the fruit being inclosed by the conforming upward side curves *a a* of the said hood. He then gives the hood a slight twist, which easily disconnects the fruit from the stem, which drops down in the chute and is conveyed thereby to his receiving-bag, and he so proceeds until the bag is full, which may be emptied into any receiving-barrel or the equivalent thereof. The fruit being thus picked without being torn, cut, or bruised is in a better shape for keeping and shipping qualities.

Having thus described my device and its advantages, what I claim as my invention, and desire to secure by Letters Patent, is—

A fruit-picker consisting of a circular-shaped hood made to conform to the general spherical form of the fruit, a horseshoe-shaped curve in the central part to receive the stem of the fruit, in combination with a rod or pole, a ferrule constructed to slide on the rod a short distance below the hood, a ring attached to the sliding ferrule to carry a chute of fabric material, a spiral spring made to connect the ferrule with the hood or upper part of the rod, all constructed substantially as and for the purpose specified.

Hamilton, Ontario, Canada, May 30, 1903.

JAMES HENRY WIDDICOMBE.

In presence of—
HIRAM BARKER,
WM. BRUCE.